US009134465B1

(12) United States Patent
Cohen (10) Patent No.: US 9,134,465 B1
(45) Date of Patent: Sep. 15, 2015

(54) DEFLECTIVE ELECTROMAGNETIC SHIELDING

(71) Applicant: Nathan Cohen, Belmont, MA (US)

(72) Inventor: Nathan Cohen, Belmont, MA (US)

(73) Assignee: Fractal Antenna Systems, Inc., Bedford, MA (US)

( * ) Notice: Subject to any disclaimer, the term of this patent is extended or adjusted under 35 U.S.C. 154(b) by 96 days.

(21) Appl. No.: 14/071,235

(22) Filed: Nov. 4, 2013

Related U.S. Application Data

(63) Continuation-in-part of application No. 14/043,781, filed on Oct. 1, 2013.

(60) Provisional application No. 61/796,119, filed on Nov. 3, 2012.

(51) Int. Cl.
*H01Q 17/00* (2006.01)
*G02B 5/00* (2006.01)
*F41H 3/00* (2006.01)

(52) U.S. Cl.
CPC ............... *G02B 5/008* (2013.01); *H01Q 17/00* (2013.01); *H01Q 17/002* (2013.01)

(58) Field of Classification Search
CPC ............... F41H 3/00; F41H 3/02; F28F 7/00; F41J 2/00; G02B 5/008; G02B 5/12; H01Q 15/14; H01Q 15/18; H01Q 17/00; H01Q 17/001; H01Q 17/002; H01Q 17/004; H01Q 17/005; H01Q 17/007; H01Q 17/008
USPC .............................. 342/1–12; 343/700 R, 787
See application file for complete search history.

(56) References Cited

U.S. PATENT DOCUMENTS

| | | | | |
|---|---|---|---|---|
| 1,434,167 | A * | 10/1922 | Thorner | 342/3 |
| 5,250,950 | A * | 10/1993 | Scherrer et al. | 342/2 |
| 6,642,881 | B1 * | 11/2003 | Lawrence et al. | 342/4 |
| 6,876,320 | B2 * | 4/2005 | Puente Baliarda | 342/12 |
| 7,256,751 | B2 | 8/2007 | Cohen | |
| 7,301,493 | B1 * | 11/2007 | Canales et al. | 342/5 |

(Continued)

FOREIGN PATENT DOCUMENTS

| | | |
|---|---|---|
| KR | 10-2010-0072382 | 7/2010 |
| WO | WO/2011138870 | 11/2011 |

OTHER PUBLICATIONS

International Search Report and the Written Opinion from corresponding PCT Application No. PCT/US2013/052940 dated Jan. 23, 2014.

(Continued)

*Primary Examiner* — Bernarr Gregory
(74) *Attorney, Agent, or Firm* — McDermott Will & Emery LLP (57) ABSTRACT

Systems according to the present disclosure provide one or more surfaces or structures that function as power transferring surfaces or structures (deflective shields) for which at least a portion of which includes or is composed of "fractal cells" placed sufficiently closed close together to one another so that a surface (plasmonic) wave causes near or similar replication of current present in one fractal cell in an adjacent fractal cell. A fractal of such a fractal cell can be of any suitable fractal shape and may have two or more iterations. The fractal cells may lie on a flat or curved sheet or layer and be composed in layers for wide bandwidth or multibandwidth transmission. The surfaces and/or structures can also provide cloaking of objects inside the shields.

20 Claims, 7 Drawing Sheets

(56) References Cited

U.S. PATENT DOCUMENTS

| | | |
|---|---|---|
| 7,994,962 B1 * | 8/2011 | Ben-Shmuel .................. 342/13 |
| 8,253,639 B2 | 8/2012 | Cohen |
| 8,378,877 B2 * | 2/2013 | Tishin et al. ...................... 342/1 |
| 8,610,617 B1 * | 12/2013 | Avouris et al. .................... 342/3 |
| 8,878,741 B2 * | 11/2014 | Mosallaei ..................... 343/787 |
| 2009/0135042 A1 * | 5/2009 | Umishita et al. .................. 342/1 |
| 2011/0063189 A1 | 3/2011 | Cohen et al. |

OTHER PUBLICATIONS

Veselago, "A Soviet 'Reviews of Modern Physics,'" Seminal Paper in Soviet Physics, USPEKHI, 10:509-514 (1968).

* cited by examiner

Exemplary Objects

Ships

Personal Clothes Person / People

Automobile

Tower

Aircraft

Helmet

DEFLECTIVE ELECTROMAGNETIC SHIELDING

RELATED APPLICATIONS

This application is a continuation-in-part of U.S. patent application Ser. No. 14/043,781 filed 1 Oct. 2013 and entitled "Radiative Transfer and Power Control with Fractal Metamaterial and Plasmonics," which claims priority to U.S. Provisional Patent Application No. 61/744,651, filed 1 Oct. 2012 and entitled "Radiative Transfer and Power Control with Fractal Metamaterial and Plasmonics"; this application claims priority to U.S. Provisional Patent Application No. 61/796,119, filed 3 Nov. 2012 and entitled "Deflective Shielding Via Electromagnetic Cloaking"; the entire contents of all of which applications are incorporated herein by reference.

BACKGROUND

Much time and effort has been devoted to the quest for so-called invisibility machines. Beyond science fiction, however, there has been little if any real progress toward this goal.

Materials with negative permittivity and permeability leading to negative index of refraction were theorized by Russian noted physicist Victor Veselago in his seminal paper in *Soviet Physics* USPEKHI, 10, 509 (1968). Since that time, metamaterials have been developed that produce negative index of refraction, subject to various constraints. Such materials are artificially engineered micro/nanostructures that, at given frequencies, show negative permeability and permittivity. Metamaterials have been shown to produce narrow band, e.g., typically less than 5%, response such as bent-back lensing. Such metamaterials produce such a negative-index effect by utilizing a closely-spaced periodic lattice of resonators, such as split-ring resonators, that all resonate. Previous metamaterials provide a negative index of refraction when a subwavelength spacing is used for the resonators.

In the microwave regime, certain techniques have been developed to utilize radiation-absorbing materials or coatings to reduce the radar cross section of airborne missiles and vehicles. While such absorbing materials can provide an effective reduction in radar cross section, these results are largely limited to small ranges of electromagnetic radiation.

SUMMARY

The present disclosure is directed to systems and techniques that provide for desired transfer of radiation by using close-packed arrangements of resonators having fractal shapes, i.e., "fractal cells." Systems and techniques according to the present disclosure provide one or more surfaces that act or function as power transfer surfaces or structures for which at least a portion of the surface or structure includes or is composed of "fractal cells" (fractal shapes functioning as antennas or resonators) placed sufficiently closed close together to one another (e.g., less than 1/20 wavelength) to produce substantial replication of current present in one fractal cell in an adjacent fractal cell. The size of the fractal cells can be adjusted based on or tailored to a desired wavelength or wavelength range of intended operation.

A fractal of such a fractal cell can be of any suitable fractal shape and may have two or more iterations. The fractal cells may lie on a flat or curved sheet or layer and be composed in layers for wide bandwidth or multibandwidth transmission. The area of a surface (e.g., sheet) and its number of fractals determines the gain relative to a single fractal cell. As each cell is fed indirectly (e.g., plasmonicly) rather than directly, 'dead' or covered or out of resonance cells do not alter the ability of the other cells to work. The boundary edges of the surface may be terminated resistively so as to not degrade the cell performance at the edges. These surfaces may be referred to as fractal plasmonic surfaces (FPS's) and can provide benefits such as shielding for/against electromagnetic radiation.

Such a fractal plasmonic surface (FPS) may be used to transfer radiation, e.g., via evanescent wave transfer. In doing so such surfaces can be used to remove radiative power from one location to another, or divert it to another location. Such surfaces may be used to essentially diffuse power delivered to a part of the FPS and dissipate and or distribute it to other specific parts or globally. For example, a power "hotspot" supplied or hit with localized power (e.g., from a beam of directed radiation) may have the power spread out or diverted to other desired locations, e.g., different areas of a related machine or structure. In some embodiments, a FPS on a closed or curved surface may further act as a cloaking device to divert power (in a wavelength or frequency of interest) from one side of the device to the other.

Exemplary embodiments of the present disclosure can provide techniques, including systems and/or methods, for protecting and/or cloaking objects at certain wavelengths/frequencies or over certain wavelength/frequency ranges (bands). Such techniques can provide an effective electromagnetic lens and/or lensing effect for certain wavelengths/frequencies or over certain wavelength/frequency ranges (bands).

In some embodiments, the effects produced by such techniques can include cloaking or so-called invisibility of the object(s) at the noted wavelengths or bands. Representative frequencies of operation can include, but are not limited to, those over a range of 500 MHz to 1.3 GHz, though others may of course be realized. Operation at other frequencies, including for example those of visible light, infrared, ultraviolet, and as well as microwave EM radiation, e.g., K, Ka, X-bands, etc. may be realized, e.g., by appropriate scaling of dimensions and selection of shape of the resonator elements.

Exemplary embodiments of the present disclosure can include a novel arrangement of resonators in a lattice-like configuration. The arrangements can include resonators of several different sizes and/or geometries arranged so that each size or geometry ("grouping") corresponds to a moderate or high quality factor, "Q," (that is moderate or low bandwidth) response that resonates within a specific frequency range.

For exemplary embodiments, fractal resonators can be used for the resonators in such structures because of their control of passbands, and smaller sizes compared to non-fractal based resonators. Their benefit arises from a size standpoint because they can be used to shrink the resonator(s), while control of passbands can reduce or eliminates issues of harmonic passbands that would resonate at frequencies not desired.

Further embodiments of the present disclosure are directed to scatterer or scattering structures. Additional embodiments of the present disclosure are directed to structures/techniques for activating and/or deactivating cloaking structures. Further embodiments of the present disclosure are directed to wideband absorbers.

It should be understood that other embodiments of FPS systems and methods according to the present disclosure will become readily apparent to those skilled in the art from the following detailed description, wherein exemplary embodiments are shown and described by way of illustration. The systems and methods of the present disclosure are capable of other and different embodiments, and details of such are capable of modification in various other respects. Accordingly, the drawings and detailed description are to be regarded as illustrative in nature and not as restrictive.

BRIEF DESCRIPTION OF THE DRAWINGS

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

While certain embodiments depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION

Systems and techniques according to the present disclosure provide for desired transfer of electromagnetic radiation by using close packed arrangements of resonators having fractal shapes, i.e., "fractal cells." Systems and techniques according to the present disclosure provide one or more surfaces that act or function as shielding and/or cloaking surfaces for which at least a portion of the surface includes or is composed of "fractal cells" (small fractal shapes, functioning as antennas or resonators) placed sufficiently close to one another so that current present in one fractal cell is replicated or reproduced to an extent in an adjacent fractal cell. Without being limited by any theoretical explanation, surface plasmonic waves are believed to cause such replication in conjunction with evanescent waves.

A fractal of such a fractal cell can be of any suitable fractal shape and may have two or more iterations. The fractal cells may lie on a flat or curved sheet or layer and be composed in layers for wide bandwidth or multibandwidth transmission. As each cell is fed plasmonicly rather than directly, "dead" or covered or out of resonance cells do not alter the ability of the other cells to work. The boundary edges of the surface may be terminated resistively so as to not degrade the cell performance at the edges. These surfaces may be referred to as fractal plasmonic surfaces (FPS's) and they can function to shield structures and/or objects by conveying or ducting EM radiation.

Such a fractal plasmonic surface (FPS) may be used to transfer radiation, e.g., via evanescent wave transfer. In doing so such surfaces can be used to remove or transfer radiative power and/or heat from one location (such as a location receiving incident radiation) to another location. Such surfaces may be used to essentially diffuse power delivered to a part of the FPS and dissipate and or distribute it to other specific parts or globally. For example, a power "hotspot" supplied or hit with localized electromagnetic power may have the power spread out or diverted to other desired locations, e.g., different areas of a related machine or structure. Thus, the structure may act as shielding for another structure or the structure itself. In some embodiments, a FPS on a closed or curved surface may act as a cloaking device to divert power (in a wavelength or frequency of interest) from one side of the device to the other. In other embodiments, a refrigeration or cooling effect may be induced by transferring heat away from a FPS.

In some embodiments, power control may also be achieved through wideband absorption by placing a resistive sheet at the edge of the fractal cells, creating a layer adjacent to the cells. Impinging electromagnetic radiation will be absorbed and not reflected or scattered. A FPS may be used to wirelessly couple a device for power transmission by placing the power as electromagnetic radiation on the FPS and then physically placing the (to be) powered device closely to the FPS. A FPS may also work even if some of the cells are damaged or missing as a variety of paths exist to convey the plasmonic transmission.

Exemplary embodiments of the present disclosure can provide techniques, including systems and/or methods, for cloaking objects at certain wavelengths/frequencies or over certain wavelength/frequency ranges (bands). Such techniques can provide an effective electromagnetic lens and/or lensing effect for certain wavelengths/frequencies or over certain wavelength/frequency ranges (bands). In some embodiments, the effects produced by such techniques can include cloaking or so-called invisibility of the object(s) at the noted wavelengths or bands. Representative frequencies of operation can include, but are not limited to, those over a range of 500 MHz to 1.3 GHz, though others may of course be realized. Operation at other frequencies, including for example those of visible light, infrared, ultraviolet, and as well as microwave EM radiation, e.g., K, Ka, X-bands, etc. may be realized, e.g., by appropriate scaling of dimensions and selection of shape of the resonator elements.

Figure 1:
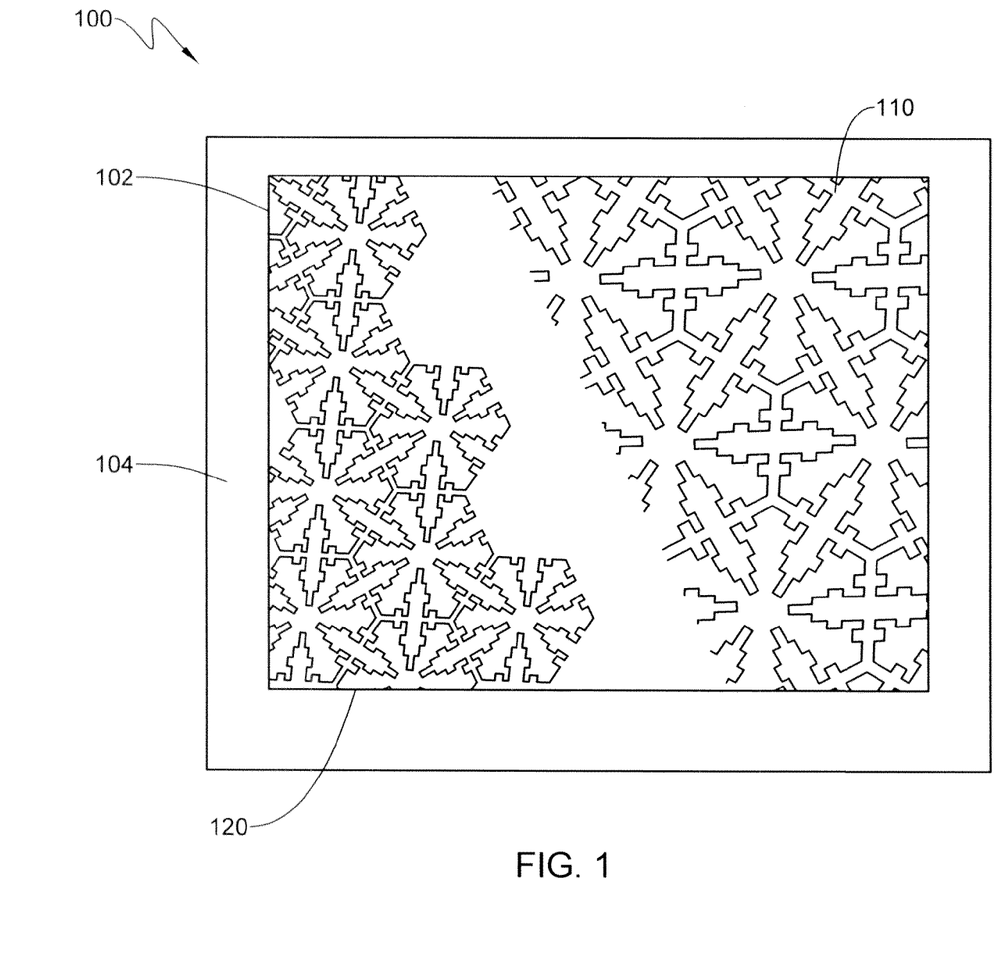
FIG. 1 depicts a diagrammatic plan view of a fractal plasmonic surface (FPS), in accordance with exemplary embodiments of the present disclosure.

The fractal cells of a FPS can be designed or configured (e.g., sized) based on the wavelength or wavelength range of radiation that the FPS is anticipated as working with or is intended for. In exemplary embodiments, a fractal cell may be sized such that its spatial extent in a given direction (e.g., a minor diameter, a major diameter, a major axis, a minor axis, etc.) is less than a wavelength of the radiation it is intended to work with. For example, a fractal cell may be constructed that has a spatial extent (in a particular direction) that is $\frac{1}{8}$, or less, of the wavelength (lambda, $\lambda$) of radiation that the cell is intended to work with. For example, considering a roughly hexagonal shaped fractal cell (e.g., as shown in FIG. 1), the "flat-to-flat" distance of the hexagonal cell may be $\frac{1}{8} \lambda$ or less of the longest wavelength of radiation foreseen for use with the fractal cell. The spacing between the cell and each of the other adjacent cells (e.g., in this case, six other cells) is preferably $\frac{1}{16} \lambda$ to $\frac{1}{20} \lambda$. When a wavelength range is anticipated for the cell or FPS having the cell, the wavelength used for design purposes can be the greatest wavelength of operation (corresponding to the lowest frequency of operation). Exemplary embodiments can be designed and built to operate to transfer radiation in the near-IR (NIR) wavelength range. Examples of such wavelengths include but are not limited to the edge of the visible red spectrum (~700 nm) through 1 mm. Other embodiments can operate at medium and/or long-wave infrared wavelengths. As stated above, the spacing between fractal cells in preferably sub-wavelength, e.g., 1/20 of a wavelength. For example, for a desired wavelength of operation of 1 mm (corresponding to 300 GHz), the spacing between adjacent fractal cells could be 50 microns (i.e., 1/20 λ).

Exemplary embodiments of the present disclosure can include an arrangement of resonators in a lattice-like configuration. The arrangements can include resonators of several different sizes and/or geometries arranged so that each size or geometry ("grouping") corresponds to a moderate or high quality factor, "Q," (that is moderate or low bandwidth) response that resonates within a specific frequency range.

For exemplary embodiments, fractal resonators can be used for the resonators in such structures because of their control of passbands, and smaller sizes compared to non-fractal based resonators. Their benefit arises from a size standpoint because they can be used to shrink the resonator(s), while control of passbands can reduce or eliminates issues of harmonic passbands that would resonate at frequencies not desired.

Further embodiments of the present disclosure are directed to scatterer or scattering structures. Additional embodiments of the present disclosure are directed to structures/techniques for activating and/or deactivating cloaking structures.

Related fractal technology is described in the following: (i) U.S. patent application Ser. No. 12/732,059 filed 25 Mar. 2010 and entitled "Wideband Electromagnetic Cloaking Systems," which is a continuation-in-part of (ii) U.S. patent application Ser. No. 12/547,104 filed 25 Aug. 2009, now U.S. Pat. No. 8,253,639, which claims benefit of (iii) U.S. Provisional Patent Application No. 61/189,966 filed 25 Aug. 2008 and (iv) U.S. Provisional Patent Application No. 61/163,824 filed 26 Mar. 2009 and entitled "Cloaking Techniques"; (v) U.S. Provisional Patent Application No. 61/163,837, filed 26 Mar. 2009 and entitled "Scatterer"; (vi) U.S. Provisional Patent Application No. 61/163,913, filed 27 Mar. 2009 and entitled "Cloaking Techniques"; and, (vii) U.S. Provisional Patent Application No. 61/237,360, filed 27 Aug. 2009 and entitled "Switching System for Cloak On Command"; the entire contents of all of which applications are incorporated herein by reference.

For exemplary embodiments, fractal resonators can be used for the resonators because of their control of passbands, and smaller sizes. A main benefit of such resonators arises from a size standpoint because they can be used to shrink the resonator(s), while control of passbands can reduce/mitigate or eliminate issues of harmonic passbands that would resonate at frequencies not desired.

Exemplary embodiments of a resonator system for use at infrared (or nearby) frequencies can be built from belts or loops having fractal cells on one or both sides. These belts or loops can function to slip or duct the infrared (heat) energy around an object located within the belts, so the object is effectively invisible and "see thru" at the infrared frequencies. Belts, or shells, having similar closed-packed arrangements for operation at a first passband can be positioned within a wavelength of one another, e.g., 1/10λ, 1/8λ, 1/4λ, 1/2λ, etc.

In exemplary embodiments, as described in further detail below, an observer can observe an original image or signal, without it being blocked by the cloaked object. Using no power, the fractal cloak having FPS can replicate the original signal (that is, the signal before blocking) with great fidelity. Exemplary embodiments can function in the infrared region (e.g., ~700 nm to ~1 mm, corresponding to ~430 THz to ~300 GHz), providing 3:1 bandwidth; operation within or near such can frequencies can provide other bandwidths as well, such as 1:1 up to 2:1 and up to about 3:1.

FIG. 1 depicts a deflective shield system 100 having a fractal plasmonic surface (FPS) 102, in accordance with the present disclosure. The FPS 102 includes a close packed arrangements of resonators having fractal shapes (e.g., "fractal cells") as denoted by 110 and 120. The FPS 102 may be part of a larger surface or area 104. The individual fractal cells are separated from the adjacent fractal cells but are sufficiently close to one another (e.g., preferably less than 1/20 wavelength) so that a surface (plasmonic) wave causes near replication of current present in one fractal cell in an adjacent fractal cell. While preferred fractal shapes are shown in FIG. 1 as being hexagonal or snowflake-like, any suitable fractal shape (e.g., deterministic) may be used and such a fractal may have two or more iterations. The fractal cells may lie on a flat or curved sheet or layer and be composed in layers for wide bandwidth or multibandwidth transmission; the fractal cells can also lie on more complex three-dimensional surfaces and structures of virtually any shape. For embodiments having layers, each layer holding a FPS can utilize fractal cells of different size and shape that those of another layer.

Examples of suitable fractal shapes (for use for shells and/or a scatting object) can include, but are not limited to, fractal shapes described in one or more of the following patents, owned by the assignee of the present disclosure, the entire contents of all of which are incorporated herein by reference: U.S. Pat. No. 6,452,553; U.S. Pat. No. 6,104,349; U.S. Pat. No. 6,140,975; U.S. Pat. No. 7,145,513; U.S. Pat. No. 7,256,751; U.S. Pat. No. 6,127,977; U.S. Pat. No. 6,476,766; U.S. Pat. No. 7,019,695; U.S. Pat. No. 7,215,290; U.S. Pat. No. 6,445,352; U.S. Pat. No. 7,126,537; U.S. Pat. No. 7,190,318; U.S. Pat. No. 6,985,122; U.S. Pat. No. 7,345,642; and, U.S. Pat. No. 7,456,799.

Other suitable fractal shape for the resonant structures can include any of the following: a Koch fractal, a Minkowski fractal, a Cantor fractal, a torn square fractal, a Mandelbrot, a Caley tree fractal, a monkey's swing fractal, a Sierpinski gasket, and a Julia fractal, a contour set fractal, a Sierpinski triangle fractal, a Menger sponge fractal, a dragon curve fractal, a space-filling curve fractal, a Koch curve fractal, an Lypanov fractal, and a Kleinian group fractal. While exemplary fractal shapes are shown in FIG. 1, the present disclosure is not limited to such and any other suitable fractal shapes (including generator motifs) may be used in accordance with the present disclosure.

With continued reference to FIG. 1, the fractal cells 110 and 120 can be formed on the FPS 102 by any suitable techniques. Of course, while a space devoid of cells is shown between cell groups 110 and 120, such is not necessary (and is included in FIG. 1 merely to show the distinction between the individual cells of the two groups). Such techniques can include additive and/or subtractive techniques. Suitable lithography techniques may be used for some embodiments. In exemplary embodiments, the fractal shapes of the fractal cells 110 and 120 can be conductive traces that are deposited on the underlying surface, e.g., a suitable substrate. Any suitable deposition techniques can be utilized. In other embodiments, the fractal cells 110 and 120 can be etched or engraved onto a surface. Any suitable micromachining or nanomachining techniques may be used.

Exemplary embodiments of system 100 can utilize a material for a substrate that has low-loss characteristics in the infrared region to facilitate heat transfer by fractal cells disposed on, disposed in, or supported by the substrate, e.g., on a supporting surface provided by the substrate. Examples of suitable materials for such substrates can include, but are not limited to, the following: chalcogenide-glasses in general; high-purity As—S, As—Se, Ge—As—Se glasses; and, $Ge_{30}As_{10}Se_{30}Te_{30}$ glass, and the like.

Figure 2:
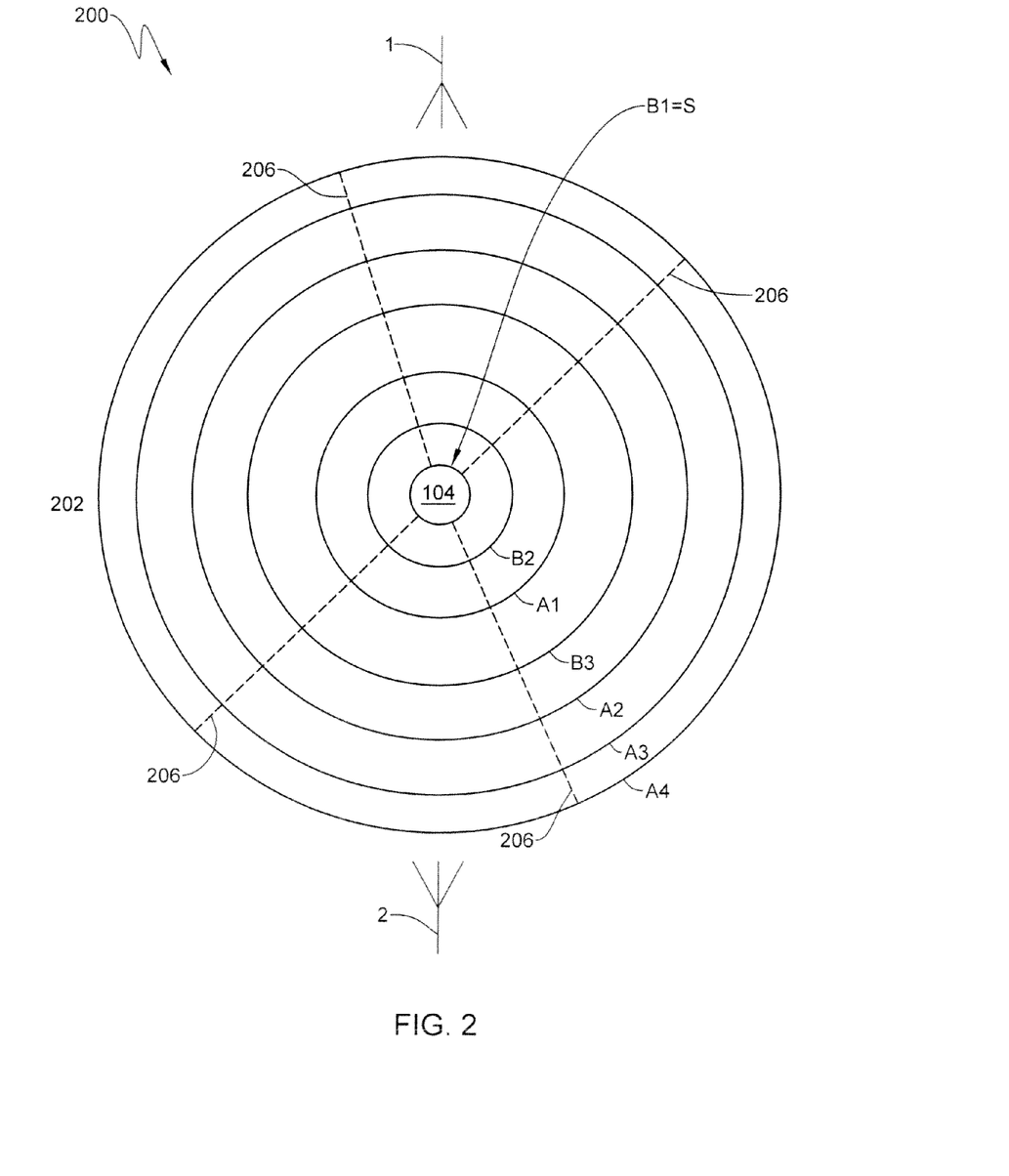
FIG. 2 depicts a diagrammatic plan view of a resonator cloaking system utilizing a number of cylindrical shells, in accordance with exemplary embodiments of the present disclosure.

FIG. 2 depicts a diagrammatic plan view of a cloaking system 200 and RF testing set up in accordance with exemplary embodiments of the present disclosure. As shown in FIG. 2, a number of concentric shells (or bands) 202 are placed on a platform (parallel to the plane of the drawing). The shells include a flexible substrate (e.g., polyimide with or without composite reinforcement) with conductive traces (e.g., copper, silver, etc.) in fractal shapes or outlines, each separate shape representing a fractal cell (e.g., similar to cells 110 and 120 of FIG. 1). The shells 202 surround an object to be cloaked (shown as 204 in FIG. 1). A transmitting antenna 1 and a receiving antenna 2 are shown at different sides of the system 200, for the purposes of illustration. The shells 202 can be held in place by suitable radial supports 206.

The shells indicated in FIG. 2 are of two types, one set (A1-A4) configured for optimal operation over a first wavelength/frequency range, and another set (B1-B3) configured for optimal operation over a second wavelength/frequency range. (The numbering of the shells is of course arbitrary and can be reordered, e.g., reversed.)

For an exemplary embodiment of system 200, the outer set of shells (A1-A4, with A1 being the innermost and A4 the outmost) had a height of about 3 to 4 inches (e.g., 3.5 inches) and the inner set of shells had a height of about 1 inch less (e.g., about 2.5 to 3 inches). The spacing between the shells with a larger fractal shape (A1-A4) was about 2.4 cm while the spacing between shells of smaller fractal generator shapes (B1-B3) was about 2.15 cm (along a radial direction). In a preferred embodiment, shell A4 was placed between shell B2 and B3 as shown. The resonators formed on each shell by the fractal shapes can be configured so as to be closely coupled (e.g., by capacitive and/or evanescent-wave coupling) and function to propagate energy by a plasmonic wave.

It will be appreciated that while, two types of shells and a given number of shells per set are indicated in FIG. 2, the number of shell types and number of shells for each set can be selected as desired, and may be optimized for different applications, e.g., wavelength/frequency bands, including the optical bands, i.e., infrared, visible, and ultraviolet, as well as x-ray.

Figure 3:
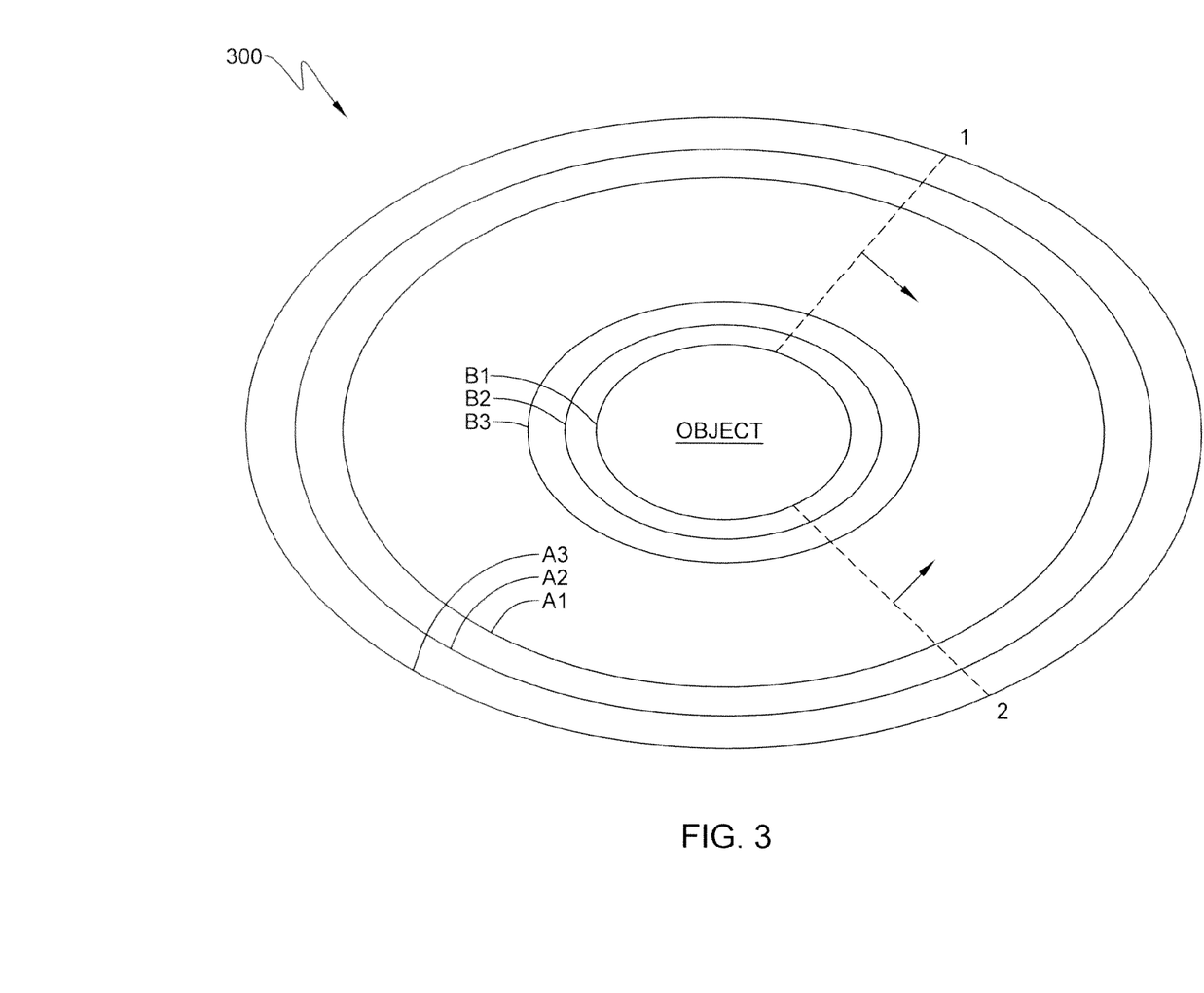
FIG. 3 depicts a diagrammatic plan view of a resonator cloaking system utilizing a number of shells having an elliptical cross-section, in accordance with an alternate embodiment of the present disclosure.

FIG. 3 depicts a diagrammatic plan view of a cloaking system (or electrical resonator system) according to an alternate embodiment in which the individual shells have an elliptical cross section. As shown in FIG. 3, a system 300 for cloaking can include a number of concentric shells (or bands) 302. These shells can be held in place with respect to one another by suitable fixing means, e.g., they can be placed on a platform (parallel to the plane of the drawing) and/or held with a frame. The shells 302 can include a flexible substrate (e.g., polyimide with or without composite reinforcement) with a close-packed arrangement of electrically conductive material formed on the first surface. As stated previously for FIG. 2, the closed-packed arrangement can include a number of self-similar electrical resonator shapes. The resonator shapes can be made from conductive traces (e.g., copper, silver, gold, silver-based ink, etc.) having a desired shape, e.g., fractal shape, split-ring shape, and the like. The shells 302 can surround an object to be cloaked, as indicated in FIG. 3.

As indicated in FIG. 3 (by dashed lines 1 and 2 and arrows), the various shells themselves do not have to form closed surfaces. Rather, one or more shells can form open surfaces. This can allow for preferential cloaking of the object in one direction or over a given angle (solid angle). Moreover, while dashed lines 1 and 2 are shown intersecting shells B1-B3 and A1-A3 of system 300, one or more shells of each group of shells (B1-B3 and A1-A3) can be closed while others are open. Additionally, it should be appreciated that the cross-sections shown for each shell can represent closed geometric shapes, e.g., spherical and ellipsoidal shells.

As indicated previously, each shell of a cloaking system (e.g., system 300) include multiple resonators in one or multiple close-packed configurations. The resonators can be repeated patterns of conductive traces. These conductive traces can be closed geometric shapes, e.g., rings, loops, closed fractals, etc. The resonator(s) can being self similar to at least second iteration. The resonators can include split-ring shapes, for some embodiments. The resonant structures are not required to be closed shapes, however, and open shapes can be used for such.

In exemplary embodiments of shell 300, the closed loops can be configured as a fractals or fractal-based shapes, e.g., as depicted by fractal cells 110 and 120 in FIG. 1. The dimensions and type of a fractal shape for a fractal cell can be the same for each shell type but can vary between shell types. This variation (e.g., scaling of the same fractal shape) can afford increased bandwidth for the cloaking characteristics of the system. This can lead to periodicity of the fractal shapes of common shell types but a periodicity between the fractal shapes of different shell types.

It will be appreciated that the resonant structures of the shells may be formed or made by any suitable techniques and with any suitable materials. For example, semiconductors with desired doping levels and dopants may be used as conductive materials. Suitable metals or metal containing compounds may be used. Suitable techniques may be used to place conductors on/in a shell, including, but no limited to, printing techniques, photolithography techniques, etching techniques, and the like.

It will also be appreciated that the shells may be made of any suitable material(s). Printed circuit board materials may be used. Flexible circuit board materials are preferred. Other material may, however, be used for the shells and the shells themselves can be made of non-continuous elements, e.g., a frame or framework. For example, various plastics may be used. In exemplary embodiments, the underlying surface or substrate on which a FPS is formed can have low loss with respect to the type of radiation that the FPS is designed for, so as to facilitate the intended heat and/or power transfer or dissipation.

Exemplary embodiments of the present disclosure can provide techniques, including systems and/or methods, for providing a radar cross section of different sizes than as would otherwise be dictated by the physical geometry of an object. Such techniques (objects/methods) can be useful for implementations such as radar decoys where a given object (decoy) is made to appear in radar cross section as like another object (e.g., missile). Representative frequencies of operation can include those over a range of 500 MHz to 1.3 GHz, though others may of course be realized. Other frequencies, include those of visible light may be realized, e.g., by appropriate scaling of dimensions and selection of shape of fractal elements.

Figure 4A:
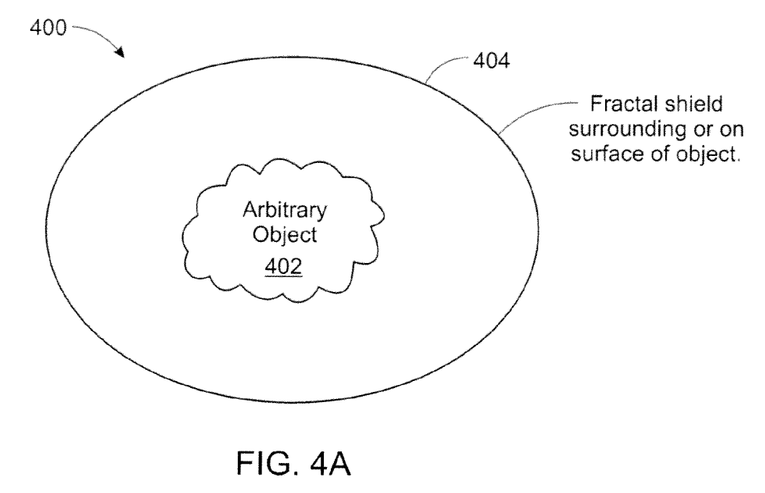
FIG. 4A depicts an example of a fractal shield surrounding or on an arbitrary object.
Figure 4B:
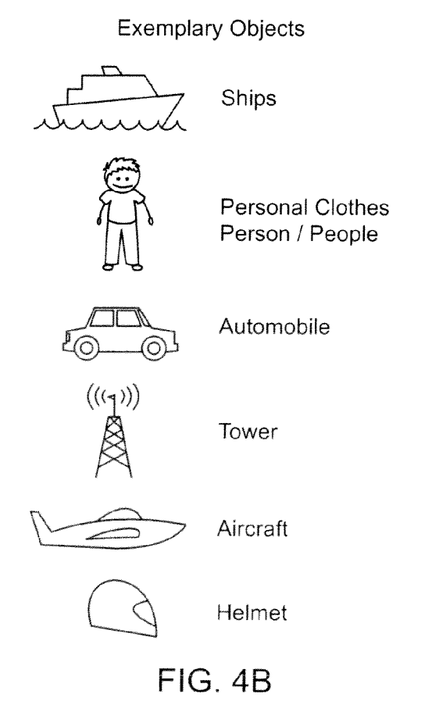
FIG. 4B depicts exemplary objects for use with a fractal shield.

FIG. 4A depicts an example of a system 400 including an arbitrary object 402 surrounded by a fractal shield 404. FIG. 4B depicts exemplary objects 402 that may be shielded by or with a fractal shield 404. Of course, such objects are merely representative and virtually any object or portion thereof may be shielded by EM radiation by a fractal shield designed (e.g., sized) for such radiation.

Figure 5:
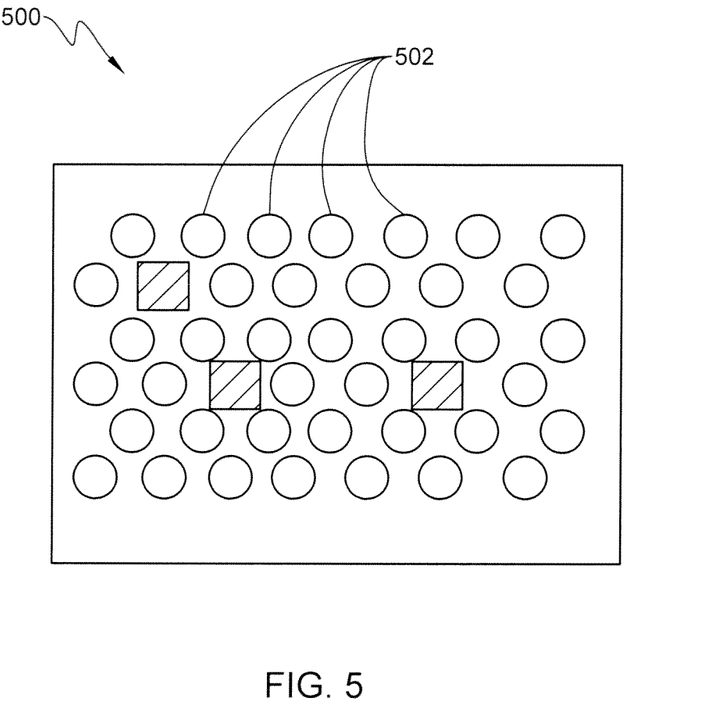
FIG. 5 illustrates the robustness or anti-fragility presented by a FPS under conditions where some fractal cells are damaged or otherwise inoperative.

FIG. 5 illustrates the robustness or anti-fragility presented by a FPS 500 under conditions where some fractal cells are damaged or otherwise inoperative. As shown, FPS 500 has a close-packed arrangement of fractal cells, indicated by circles 502. The close-packed arrangement provides many paths by which energy may be transferred from one area of the FPS to another, even in the presence of damaged or otherwise inoperative fractal cells (represented by the black squares shown).

Figure 6A:
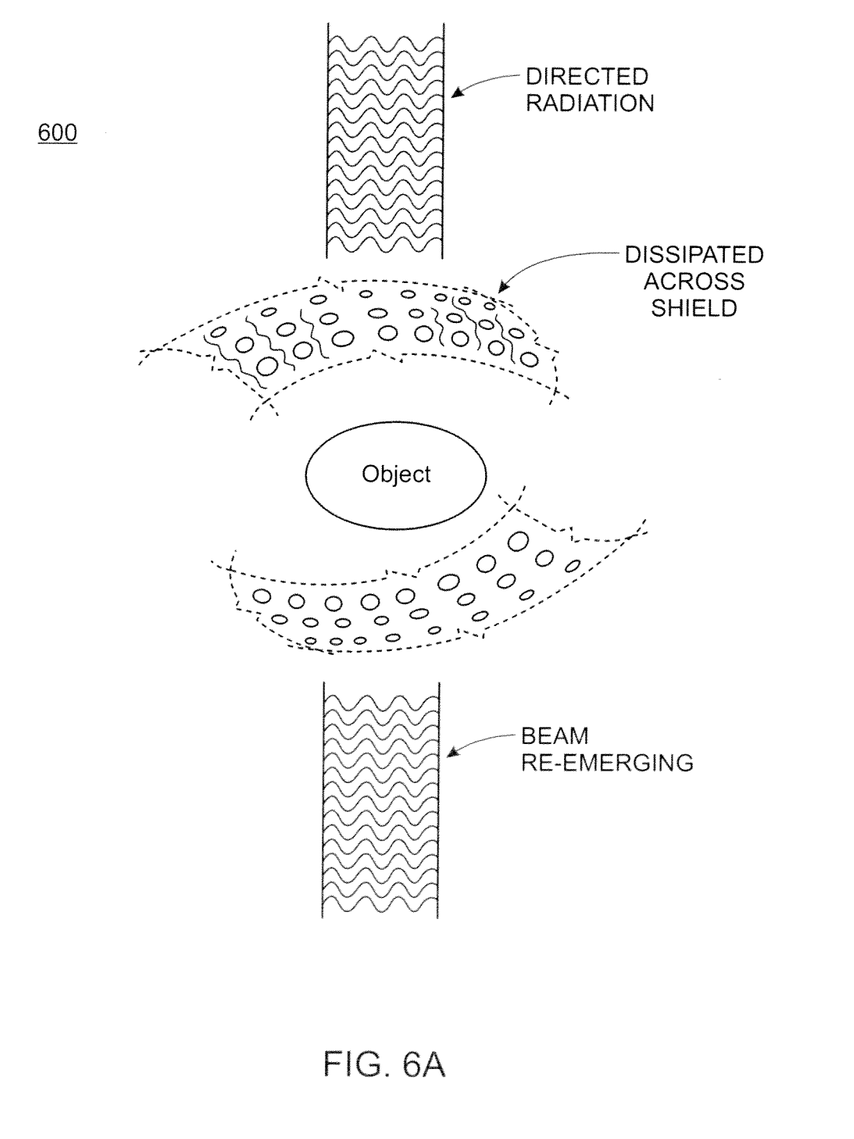
FIG. 6A depicts an example of a fractal shield dissipating/transferring incident radiation.

FIG. 6A depicts an example 600 of a FPS-based shield 602 used to dissipate incident radiation, which may be directed radiation of high intensity or fluence. As shown, radiation that is incident on a localized area of the shield 602 can be transferred from an area of incidence, around the object 604, and dissipated and/or retransmitted via plasmonic coupling and radiative transfer between the fractal cells of the FPS-based shield 602.

Figure 6B:
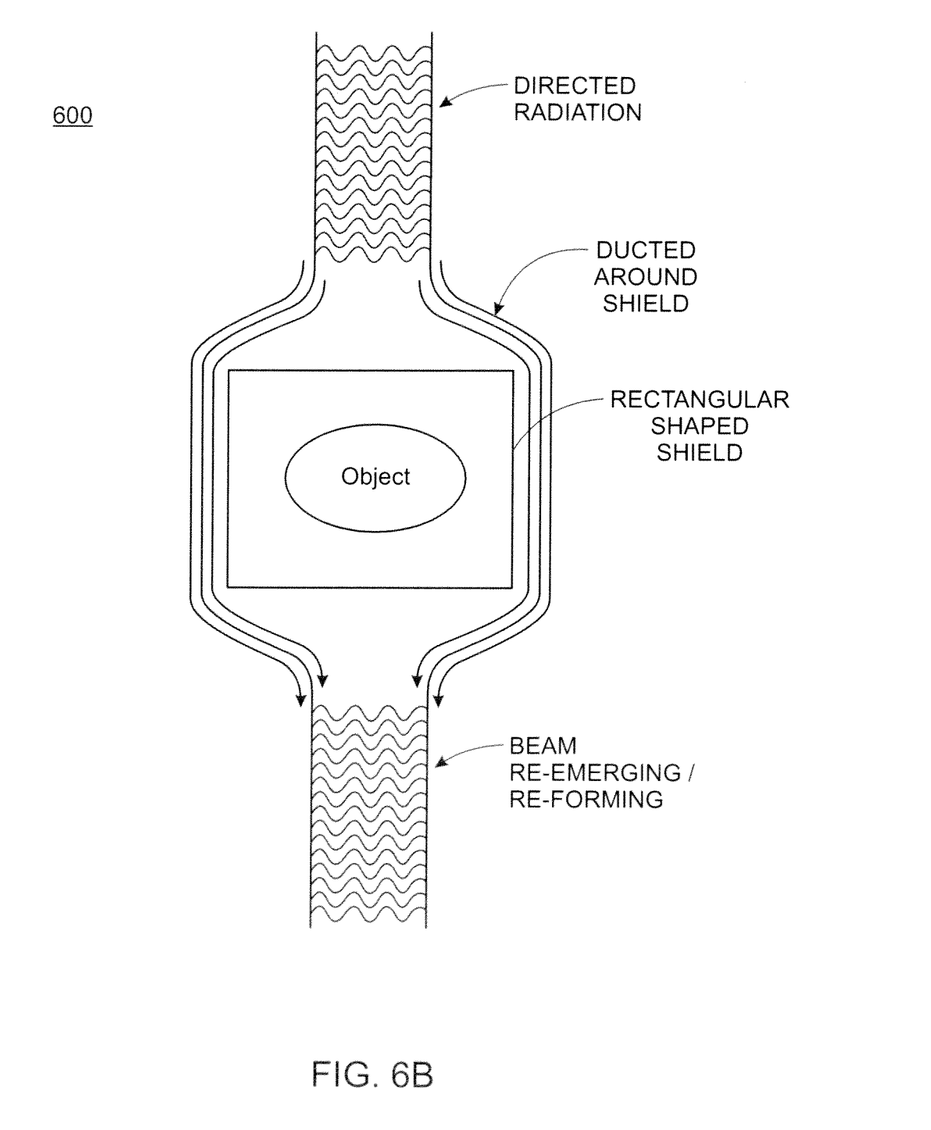
FIG. 6B shows another example in which directed radiation is incident on a rectangular shield.

FIG. 6B shows another example in which directed radiation is incident on a rectangular shield 602—exemplifying that a shield need not be circular/elliptical or have circular or elliptical symmetry or any symmetry for that matter. As shown, the incident radiation is ducted (indicated by flow lines) over the surface of the shield 602 and thus around the object 604 within the shield without actually impinging on the object or transferring any energy or momentum to the object.

Accordingly the subject technology in accordance with the present disclosure can provide protection for a desired object (e.g., a person or thing) from incident radiation such as high energy density electromagnetic waves and/or impulses that would otherwise tend to damage or destroy the object(s). Such deflective shields, or deflectors, can be used on or for three-dimensional surfaces in addition to two-dimensional surfaces. Such a deflector allows the electromagnetic waves or impulses to emerge or re-form on the far side of the object, not passing through the object, wand with minimum (or reduced) absorption and reflection of the waves or impulses; moreover, the momentum of the incident radiation is not conveyed to the objected (or such conveyance is reduced compared to the case where no shield is used).

While embodiments are shown and described herein as having fractal-based EM shields in the shape of concentric rings (circular cylinders), EM shields in accordance with the present disclosure can take other shapes in other embodiments. For example, one or more shells could have a generally spherical shape (with minor deviations for structural support). In an exemplary embodiment, the shells could form a nested arrangement of such spherical shapes, around an object to be shielded (at the targeted/selected frequencies/wavelengths). Shell cross-sections of angular shapes, e.g., triangular, hexagonal, while not preferred, may be used. Further, shields may be placed on or integrated with one or more surfaces of a particular object to be shielded. Such shields and shield structures may be implemented in or configured as conformable surfaces which adapt or conform to any underlying surface or structure.

One skilled in the art will appreciate that embodiments and/or portions of embodiments of the present disclosure can be implemented in/with computer-readable storage media (e.g., hardware, software, firmware, or any combinations of such), and can be distributed and/or practiced over one or more networks. Steps or operations (or portions of such) as described herein, including processing functions to derive, learn, or calculate formula and/or mathematical models and geometric shapes utilized and/or produced by the embodiments of the present disclosure, can be processed by one or more suitable processors, e.g., central processing units ("CPU's") implementing suitable code/instructions in any suitable language (machine dependent on machine independent).

While certain embodiments and/or aspects have been described herein, it will be understood by one skilled in the art that the methods, systems, and apparatus of the present disclosure may be embodied in other specific forms without departing from the spirit thereof.

For example, while certain wavelengths/frequencies of operation have been described, these are merely representative and other wavelength/frequencies may be utilized or achieved within the scope of the present disclosure.

Furthermore, while certain preferred fractal generator shapes have been described others may be used within the scope of the present disclosure. Accordingly, the embodiments described herein are to be considered in all respects as illustrative of the present disclosure and not restrictive.

What is claimed is:

1. A fractal-cell deflective shield system comprising:
a shield including a plurality of close-packed fractal cells disposed on a supporting surface, wherein the shield is configured to deflect electromagnetic radiation around an object, wherein each fractal cell includes a fractal shape defining an electrical resonator, wherein each fractal cell has a spatial extent in a given direction of less than $\frac{1}{8}$ of an operation wavelength of incident radiation, and wherein the plurality of fractal cells are positioned sufficiently close to one another to support plasmonic transfer of energy between the fractal cells.

2. The system of claim 1, wherein the supporting surface is part of a substrate, and wherein the substrate comprises a low-loss material in the infrared region.

3. The system of claim 2, wherein the substrate comprises chalcogenide glass.

4. The system of claim 1, wherein the fractal shape comprises a conductive trace.

5. The system of claim 1, wherein the fractal shape comprises a slot, and wherein each resonator forms a slot antenna.

6. The system of claim 1, wherein the fractal shape is selected from the group consisting of a Koch fractal, a Minkowski fractal, a Cantor fractal, a torn square fractal, a Mandelbrot, a Caley tree fractal, a monkey's swing fractal, a Sierpinski gasket, and a Julia fractal.

7. The system of claim 1, wherein the fractal shape is selected from the group consisting of a contour set fractal, a Sierpinski triangle fractal, a Menger sponge fractal, a dragon curve fractal, a space-filling curve fractal, a Koch curve fractal, an lypanov fractal, and a Kleinian group fractal.

8. The system of claim 1, wherein the fractal cells are separated by about $\frac{1}{20} \lambda$.

9. The system of claim 8, wherein $\lambda$ is in the visible spectrum.

10. The system of claim 8, wherein $\lambda$ is in the infrared spectrum.

11. The system of claim 8, wherein $\lambda$ is in the ultraviolet spectrum.

12. The system of claim 8, wherein $\lambda$ is in the RF spectrum corresponding to a RF frequency range.

13. The system of claim 1, wherein the plurality of fractal cells are configured as a fractal plasmonic surface (FPS), wherein the FPS is operative to transfer power from one location on the FPS to another desired location on the FPS.

14. The system of claim 1, wherein the support surface comprises chalcogenide glass.

15. A fractal-cell shield system comprising:
a shield including a plurality of concentric shells, wherein the shield is configured to deflect electromagnetic radiation around an object, each shell including a substrate having first and second surfaces and a plurality of close-packed fractal cells disposed on a supporting surface disposed on the first surface, wherein each fractal cell includes a fractal shape defining an electrical resonator, and wherein the plurality of fractal cells are positioned sufficiently close to one another to support plasmonic transfer of energy between the fractal cells.

16. The system of claim 15, wherein the electrical system is configured and arranged so that radiation incident on the system from a given direction has an intensity on a point-by-point basis such at each respective antipodal point, relative to an object placed at the center of the system, the radiation has the same or similar intensity.

17. The system of claim 15, wherein the antenna system is configured and arranged so that radiation incident on the system from a direction in cylindrical coordinates has the same or similar intensity at the antipodal point after having traversed the antenna system.

18. The system of claim 15, wherein the plurality of antenna shells comprises a first pair of shells having similar closed-packed arrangements for operation at a first passband, wherein the two shells are positioned within $\frac{1}{8}\lambda$ of one another.

19. The system of claim 15, wherein the fractal shape is selected from the group consisting of a Koch fractal, a Minkowski fractal, a Cantor fractal, a torn square fractal, a Mandelbrot, a Caley tree fractal, a monkey's swing fractal, a Sierpinski gasket, a Julia fractal, a contour set fractal, a Sierpinski triangle fractal, a Menger sponge fractal, a dragon curve fractal, a space-filling curve fractal, a Koch curve fractal, an Lypanov fractal, and a Kleinian group fractal.

20. The system of claim 15, wherein the fractal cells are separated by about $\frac{1}{20}\lambda$, wherein $\lambda$ is in the infrared, visible, or ultraviolet spectra.

* * * * *